No. 877,337. PATENTED JAN. 21, 1908.
J. C. HERR.
BICYCLE.
APPLICATION FILED MAR. 4, 1907.

WITNESSES,
James G. Carr
Samuel F. Carr

John C. Herr, INVENTOR.
By Robert S. Carr, Atty.

UNITED STATES PATENT OFFICE.

JOHN C. HERR, OF MIDDLETOWN, OHIO.

BICYCLE.

No. 877,337.   Specification of Letters Patent.   Patented Jan. 21, 1908.

Application filed March 4, 1907. Serial No. 360,363.

*To all whom it may concern:*

Be it known that I, JOHN C. HERR, a citizen of the United States, residing at Middletown, Butler county, Ohio, have invented a new and useful Improvement in Bicycles, of which the following is a specification.

My invention relates to bicycles and the objects of my improvements are, to utilize the hollow mast of the frame for a pump cylinder; to secure the seat post in the mast with an expander provided with air passages; to combine the expander wrench with the pump handle; to assemble the movable parts of the pump with the seat post as an interchangeable unit for different bicycles and to provide simplicity and durability of construction combined with facility of operation and efficiency of action. These objects are attained in the following described manner, as illustrated in the accompanying drawings, in which:—

Figure 1:
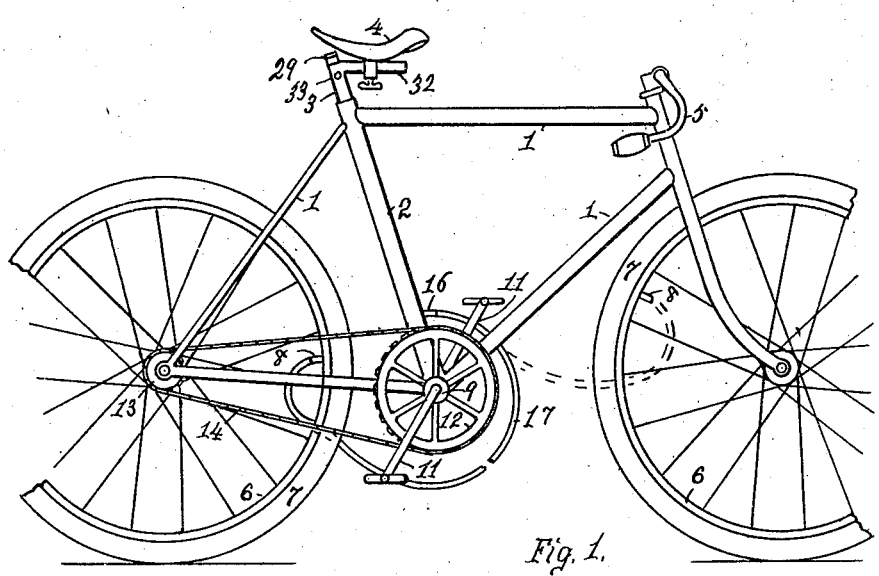
Figures 2, 3, 4:
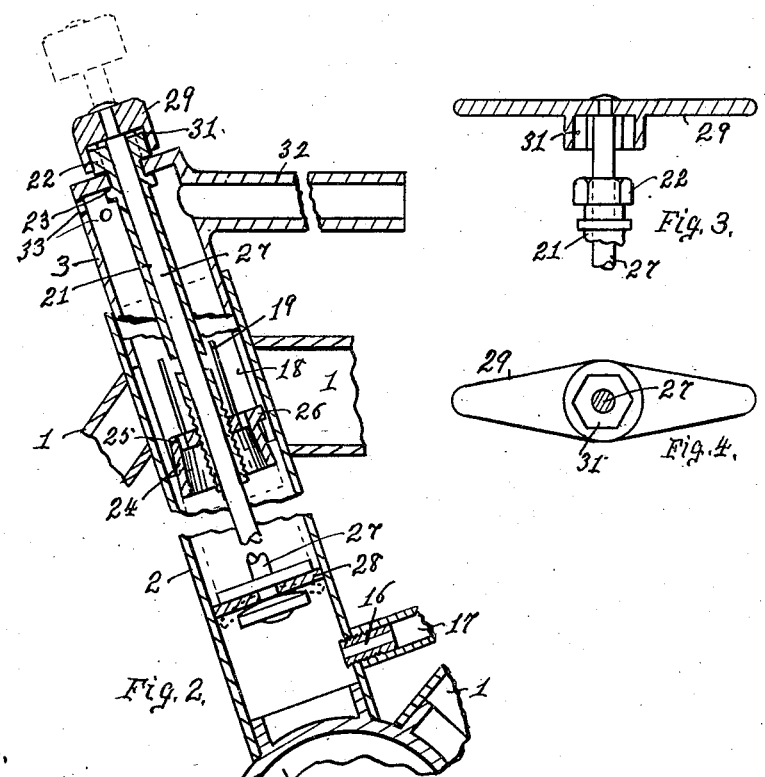

Figure 1 is the side elevation of a bicycle embodying my improvements; Fig. 2 a longitudinal section showing portions of the frame, together with the seat post and members of the pump, and Figs. 3 and 4 a longitudinal section and an inverted plan respectively of the combined handle and wrench.

In the drawings, 1 represents the frame of a bicycle, 2 the mast, 3 the seat post, 4 the saddle, 5 the handle bars, 6 the wheels, 7 the pneumatic tires provided with valved nipples 8, 9 the hanger bracket, 11 the cranks, 12 and 13 the sprocket wheels and 14 the sprocket chain, all constructed and arranged in the ordinary manner.

The tubular mast 2 having its lower extremity closed by the hanger bracket or by other suitable means, is provided with a discharge nipple 16 whereon one end of a flexible tube 17 is removably secured and the other end thereof is adapted to detachably engage in the usual manner with the valved nipples 8. The tubular seat post 3 having its lower end portion divided into sections 18 by means of longitudinal slots 19, is adjustably inserted or telescoped within the top portion of mast 2. A hollow bolt 21 having a preferably hexagonal head 22 is extended through an opening 23 formed in the top wall of the seat post, and a tapered expander 24 is adjustably threaded thereon and provided with air passages 25 and with a lug 26 to prevent it from turning by movably engaging with the walls of one of the slots 19. Said expander is movable longitudinally by means of the bolt for clamping the seat post in different adjusted positions within the mast.

A plunger or valve rod 27 movably inserted through bolt 21 is provided on one end with an ordinary piston valve 28 and on the other end with a handle 29. Said handle is provided on its under side with a wrench socket 31 adapted to detachably engage with the head 22 of bolt 21 for actuating the expander. For a seat post having a solid arm 32 one or more air passages 33 may be formed through its wall for the admission of air to the interior of the mast or pump cylinder.

In operation, the saddle may be adjusted in a forward direction to clear the pump handle during the reciprocation of the piston valve, or the adjustment of the seat post, thereby within the mast. The air admitted to the interior of the mast through the seat post and through the expander may be pumped through the flexible tube by means of the piston valve in the usual manner for inflating the tires to any desired extent.

If desired, the plunger rod may be formed integral with the expander bolt 21 and reciprocated with the piston valve by means of the seat post for a handle.

Having fully described my improvements, what I claim as my invention and desire to secure by Letters Patent of the United States is:—

1. The combination of a tubular seat post provided with an air passage, an expander therefor, a hollow bolt adjustably threaded therein, a plunger rod movable longitudinally through the bolt and provided with a valved piston and with an operating handle on its respective ends, said handle and bolt having separable interengaging parts whereby the bolt may be turned to move the expander.

2. The combination of a tubular seat post provided with an air passage, a tapered expander therefor and provided also with an air passage, a hollow bolt for actuating the expander, a plunger rod movably extended through the bolt and provided on one end with a piston valve, and a handle secured on the other end of the rod, said handle being provided with means for turning the bolt to move the expander.

3. The combination of a seat post, a hollow bolt provided with an expander therefor, operable by turning the bolt, a plunger rod provided with a piston and movable through the bolt, a handle secured on the rod and a socket wrench thereon for turning the bolt.

4. The combination of an expansible tube, an expander therefor provided with an air passage, a hollow bolt swiveled in the axial line of the tube and adjustably threaded in the expander, a plunger rod inserted therethrough, a handle for reciprocating the rod, said handle being provided with means for turning the bolt to move the expander longitudinally within the tube.

JOHN C. HERR.

Witnesses:
   DAVID PIERCE,
   R. S. CARR.